(12) United States Patent
Rust

(10) Patent No.: US 12,392,304 B2
(45) Date of Patent: Aug. 19, 2025

(54) ACOUSTIC ATTENUATION VANES FOR FAN DUCTS IN AN AIRCRAFT

(71) Applicant: The Boeing Company, Arlington, VA (US)

(72) Inventor: Charles William Rust, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/531,063

(22) Filed: Dec. 6, 2023

(65) Prior Publication Data

US 2025/0188888 A1    Jun. 12, 2025

(51) Int. Cl.
*F02K 1/70* (2006.01)
*F02K 1/82* (2006.01)
*F02K 1/72* (2006.01)

(52) U.S. Cl.
CPC ............... *F02K 1/70* (2013.01); *F02K 1/827* (2013.01); *F02K 1/72* (2013.01)

(58) Field of Classification Search
CPC ............... F02K 1/70; F02K 1/72; F02K 1/827
See application file for complete search history.

(56) References Cited

U.S. PATENT DOCUMENTS

| | | | | |
|---|---|---|---|---|
| 3,618,700 A * | 11/1971 | Bond | ...................... | F02K 1/827 181/219 |
| 3,829,020 A | 8/1974 | Stearns | | |
| 4,373,328 A * | 2/1983 | Jones | ...................... | F02K 1/72 239/265.31 |
| 6,439,840 B1 * | 8/2002 | Tse | ...................... | F02C 7/24 415/208.1 |
| 8,127,532 B2 * | 3/2012 | Howe | ...................... | F02K 3/06 60/226.3 |
| 10,060,390 B2 * | 8/2018 | Zysman | ...................... | F02K 1/72 |

(Continued)

OTHER PUBLICATIONS

Henderson et al., "An MDOE Assessment of Nozzle Vanes for High Bypass Ratio Jet Noise Reduction", AIAA paper No. 2006-2543, 12th AIAA/CEAS Aeroacoustics Conference (27th AIAA Aeroacoustics Conference), Cambridge, Massachusetts, May 8-10, 2006, pp. 1-10. (Year: 2006).*

(Continued)

*Primary Examiner* — Lorne E Meade
(74) *Attorney, Agent, or Firm* — COATS & BENNETT, PLLC

(57) ABSTRACT

An engine of an aircraft comprising an engine core that produces thrust to propel the aircraft. A fan duct extends along a length of the engine core and is positioned between an engine core nacelle and a fan nacelle with the fan duct. A thrust reverser is positioned along the fan duct and has blocker doors and drag links. The thrust reverser is positionable between an open position and a closed position. The open position locates the blocker doors for the air to move along the fan duct and exit at the nozzle exit. The closed position locates the blocker doors across the fan duct to direct the air out of the fan duct through an opening in the fan nacelle. An acoustic attenuation system is mounted in the fan duct and positioned between the thrust reverser and the nozzle exit with the acoustic attenuation system configured to reduce noise caused by fan blade-pass frequency moving through the fan duct.

20 Claims, 9 Drawing Sheets

(56) References Cited

U.S. PATENT DOCUMENTS

| | | |
|---|---|---|
| 10,309,341 B2 | 6/2019 | Harpal et al. |
| 10,612,490 B2 * | 4/2020 | Byrne .................... F02K 1/625 |
| 10,961,950 B2 | 3/2021 | Howe |
| 2003/0089824 A1 | 5/2003 | Sternberger |
| 2019/0024609 A1 | 1/2019 | Chuck et al. |
| 2023/0079348 A1 | 3/2023 | Alonso-Miralles et al. |

OTHER PUBLICATIONS

EP Search Report mailed Apr. 22, 2025 in re EP Application No. 24216121.4.

* cited by examiner

ACOUSTIC ATTENUATION VANES FOR FAN DUCTS IN AN AIRCRAFT

TECHNOLOGICAL FIELD

The present disclosure relates generally to the field of noise reduction for aircraft and, more specifically, to placing acoustic vanes along within a fan duct in an aircraft engine.

BACKGROUND

Noise regulations limit the allowable noise levels for airports. The noise regulations limit the impact of aircraft noise on communities that are located near the airports. Various federal and local authorities establish the maximum allowable noise for a given time of the day. Normally, allowable noise levels are higher during the daytime and are reduced during evening and nighttime hours. Some airports have microphones installed around their grounds to monitor the noise levels. Monetary fines or other measures can be taken to enforce the regulations.

Aircraft are designed to reduce the amount of noise that is made during operation. Some existing designs position noise reducing materials within the engines. Some designs rely on hollow structures with perforated face sheets integrated into a housing that extends around the engine. The thickness of a material is often proportional to the fan blade-pass frequency characteristics with a thicker material providing lower frequency noise reduction than a thinner material that targets higher frequency noise. However, thicker materials often lead to difficulties. One issue is forming a relatively thick material with internal structures such as cells and core that is effective in reducing noise. The thicker materials are often difficult to design effectively and/or manufacture. Further, the attachment of thicker materials to the engine housing can interfere with the integration of the engine core mounted accessories. The material can encroach on components of the engine. This encroachment limits the thickness that is available for use in a material to reduce the noise.

Therefore, there is a need for designs that reduce noise and are able to be effectively designed and manufactured. The designs also are configured to allow for engine operation without interfering with the operation.

SUMMARY

One aspect is directed to an engine of an aircraft comprising a fan and an engine core that produces thrust to propel the aircraft. A fan duct positioned downstream from the fan and extends along a length of the engine core and is positioned between an engine core nacelle inner wall and a fan nacelle with the fan duct comprising an inlet and a nozzle exit. A thrust reverser is positioned along the fan duct and comprises a plurality of blocker doors and drag links. The thrust reverser is positionable between an open position and a closed position. The open position locates the blocker doors for the air to move along the fan duct and exit at the nozzle exit. The closed position locates the blocker doors across the fan duct to direct the air out of the fan duct through an opening in the fan nacelle. An acoustic attenuation system is mounted in the fan duct and positioned between the thrust reverser and the nozzle exit with the acoustic attenuation system configured to reduce fan blade-pass frequency noise caused by the fan.

In another aspect, the acoustic attenuation system comprises acoustic vanes positioned along the fan duct aft of the blocker doors and the drag links.

In another aspect, the acoustic vanes are radially aligned in the fan duct around the engine core nacelle inner wall and connected to a wall of the fan duct.

In another aspect, the acoustic vanes comprise a forward end that is tapered, an opposing aft end, an inner lateral side, and an outer lateral side with the outer lateral side mounted to a wall of the fan duct.

In another aspect, the forward end of each of the acoustic vanes is radially aligned with one of the drag links for the acoustic vanes to be positioned in the fan duct in disturbed air flow.

In another aspect, the acoustic vanes comprise a height that is less than a width of the fan duct for the inner lateral sides to be exposed within the fan duct.

In another aspect, the acoustic vanes comprise a forward end and an aft end with the aft ends aligned with a plane aligned at the nozzle exit.

In another aspect, the fan nacelle comprises a forward section that is fixed and an aft section that translates along the fan duct with the acoustic attenuation system mounted to the aft section.

In another aspect, the acoustic vanes comprise a forward end, an opposing aft end, an inner lateral side, and an outer lateral side with the acoustic vanes comprising a shape that is curved between the inner lateral side and the outer lateral side.

One aspect is directed to an engine of an aircraft comprising a fan and an engine core configured to produce thrust to propel the aircraft. A fan duct extends along the engine core downstream from the fan. Blocker doors are mounted in the fan duct. Drag links are mounted in the fan duct and connected to the blocker doors with the drag links configured to move the blocker doors between an open position to direct airflow along the fan duct and a closed position to direct air out of the fan duct. Acoustic vanes are mounted in the fan duct aft of the drag links and radially aligned with the drag links with the acoustic vanes positioned in disturbed air caused by the drag links.

In another aspect, the acoustic vanes comprise a forward end and a trailing end and are positioned in the fan duct with the forward ends radially aligned with the drag links.

In another aspect, the acoustic vanes comprise a flat shape with an inner lateral side that is straight and with the inner lateral sides aligned with the drag links.

In another aspect, further comprising a fan nacelle with a forward section that is fixed relative to the fan duct and an aft section that translates relative to the fan duct with the acoustic vanes mounted on the aft section of the fan nacelle.

In another aspect, the acoustic vanes comprise: a first section mounted to and extending outward into the fan duct from a first side wall of the fan duct; a second section mounted to and extending outward into the fan duct from a second side wall of the fan duct; and with the first section and the second section aligned on opposing sides of the fan duct and comprising inner lateral sides that face together.

In another aspect, the inner lateral sides of the first section and the second section abut together.

One aspect is directed to a method of reducing noise of an engine of an aircraft. The method comprises: mounting acoustic vanes in a fan duct of the engine with the acoustic vanes positioned aft of drag links of a reverse thruster and positioned in disturbed air caused by the drag links; positioning the drag links in a first position and positioning blocker doors in an open position to enable airflow through the fan duct from an inlet to an nozzle exit; positioning the drag links in a second position and positioning the blocker doors in a closed position to direct the airflow in the fan duct away from the nozzle exit.

In another aspect, the method further comprises moving the drag links between the first and second positions and the blocker doors between the open position and the closed position without moving the acoustic vanes.

In another aspect, the method further comprises translating the acoustic vanes along the fan duct while moving the drag links from the first position to the second position.

In another aspect, each of the acoustic vanes comprises an inner section and an outer section and the method further comprising translating the inner section relative to the outer section when moving the drag links from the first position to the second position.

In another aspect, the method further comprises maintaining the inner sections of the acoustic vanes in fixed positions while translating the outer sections.

The features, functions and advantages that have been discussed can be achieved independently in various aspects or may be combined in yet other aspects, further details of which can be seen with reference to the following description and the drawings.

DETAILED DESCRIPTION

Figure 1:
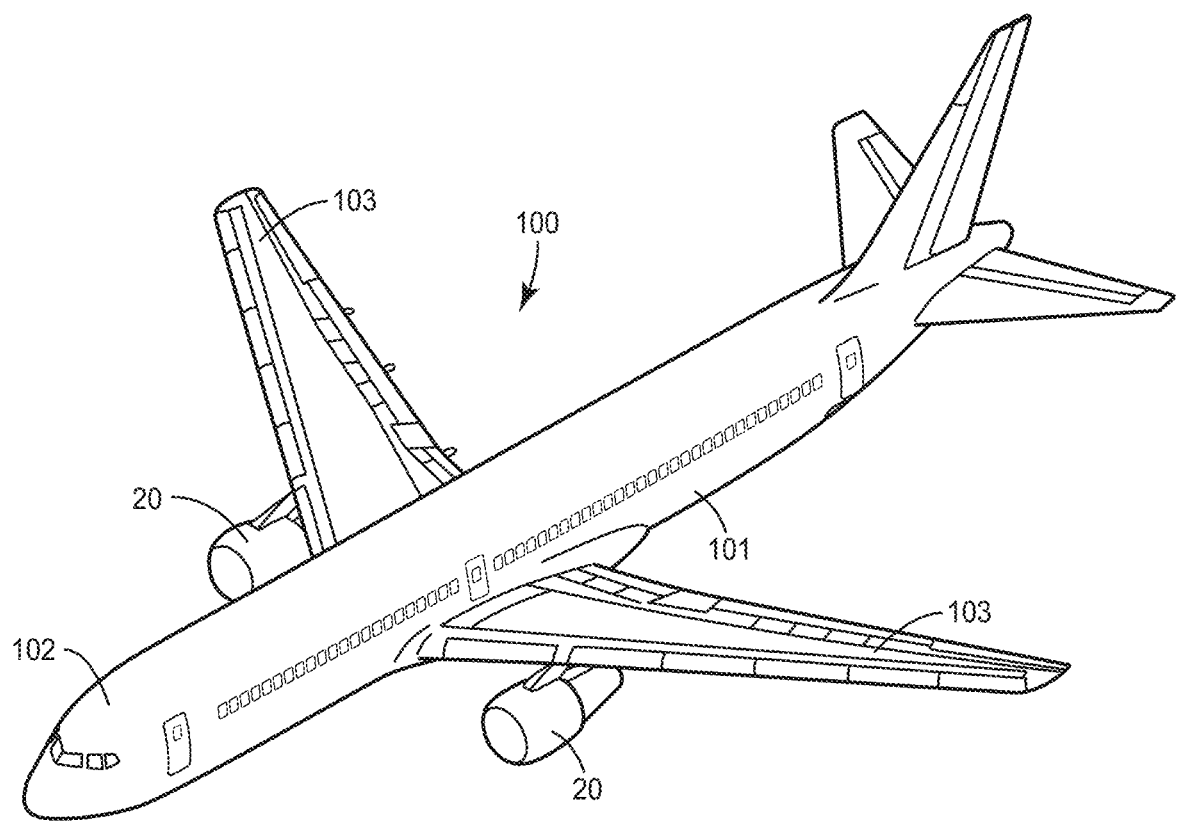
FIG. 1 is an isometric view of an aircraft with a pair of engines.

FIG. 1 illustrates an aircraft 100 configured to transport passengers and/or cargo. The aircraft 100 generally includes a fuselage 101 with a flight deck 102 configured to accommodate flight personnel to control the flight. Engines 20 are mounted on the wings 103 on opposing sides of the fuselage 101.

Figure 2:
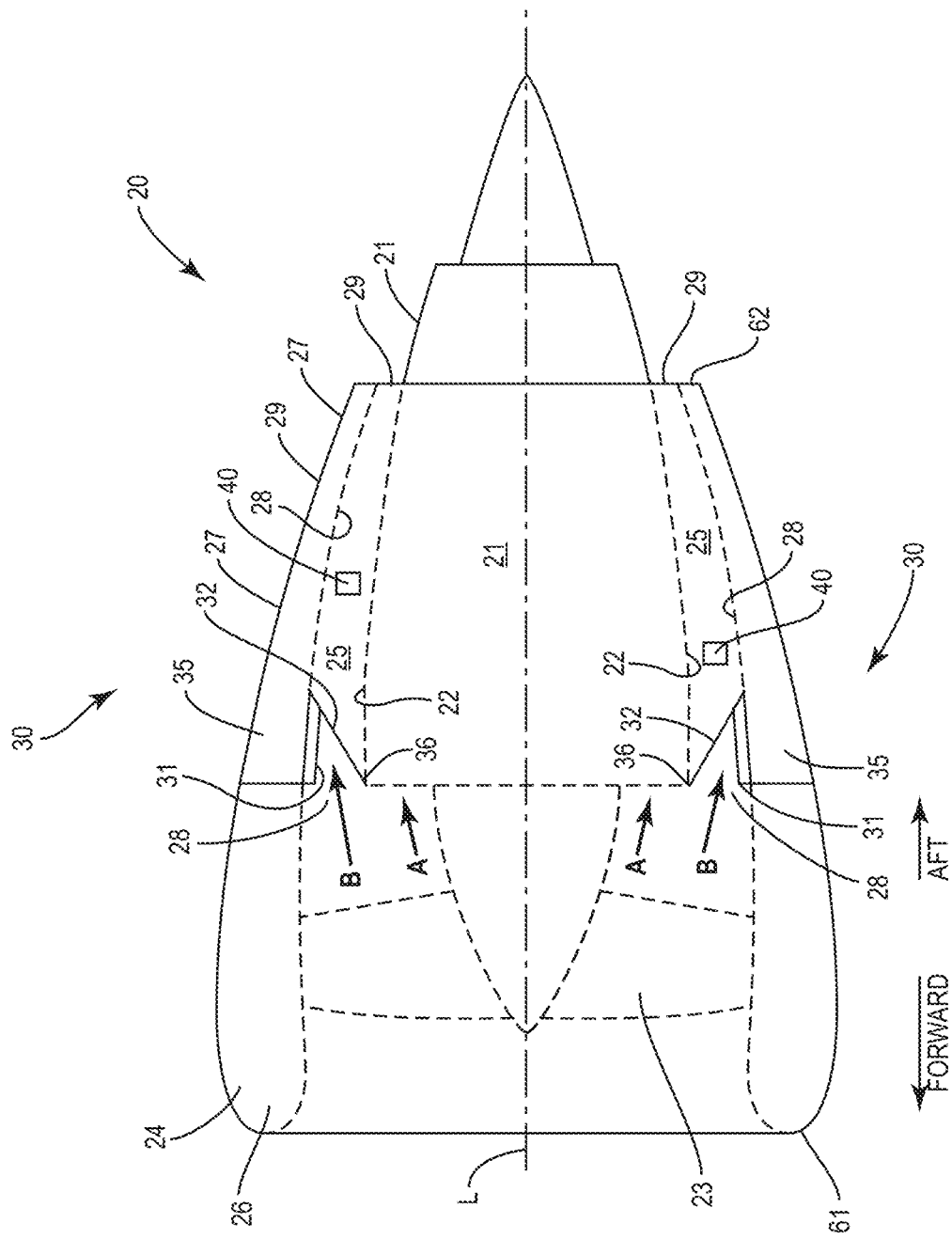
FIG. 2 is a side schematic view of an engine with an acoustic attenuation system positioned in a fan duct.

A variety of different engines 20 can power the aircraft 100. In some examples, the engines 20 are gas turbine engines. FIG. 2 schematically illustrates an engine 20 with certain features that would be blocked from view being illustrated in broken lines. The engine 20 includes an engine core 21 surrounded by a core nacelle inner wall 22. Components of the engine core 21 rotate about a longitudinal axis L to power a fan 23 arranged in front of the engine core 21. The fan 23 is surrounded by a fan nacelle 24 that includes a forward end 61 and an aft end 62. The fan nacelle 24 includes a fixed section 26 such as in the form of an inlet cowl at a forward portion of the fan nacelle 24. The fan nacelle 24 also includes a translating section such as in the form of a translating sleeve 27 at an aft end. A portion of the air that enters the engine 20 and passes the fan 23 enters the engine core 21 (as indicated by arrows A). The remainder of the air enters a fan duct 25 that extends around the engine core 21 (as indicated by arrows B).

The engine 20 is equipped with a thrust reverser 30 configured to reverse or divert an aircraft engine's thrust, so that it is directed in a forward direction rather than in an aft direction. The thrust reverser 30 helps to slow the aircraft 100 just after landing or touchdown to reduce wear on the brakes and help to enable shorter landing distances. FIG. 2 illustrates the thrust reverser 30 in an idle state such as during flight. The sleeve 27 is positioned forward against the fixed section 26 of the fan nacelle 24. Blocker doors 31 are positioned to allow for airflow through the length of the fan duct 25 and out through an nozzle exit 29 at an aft end. One or more drag links 32 are connected to the blocker doors 31. The drag links 32 include a first end 36 that is connected to the core nacelle inner wall 22 and/or the engine core 21. The drag links 32 also include a second end 37 that is mounted to the blocker door 31. FIG. 2 illustrates the drag links 32 in a first orientation that extends across the fan duct 25 and positions the blocker doors 31 in the open position.

Figure 3:
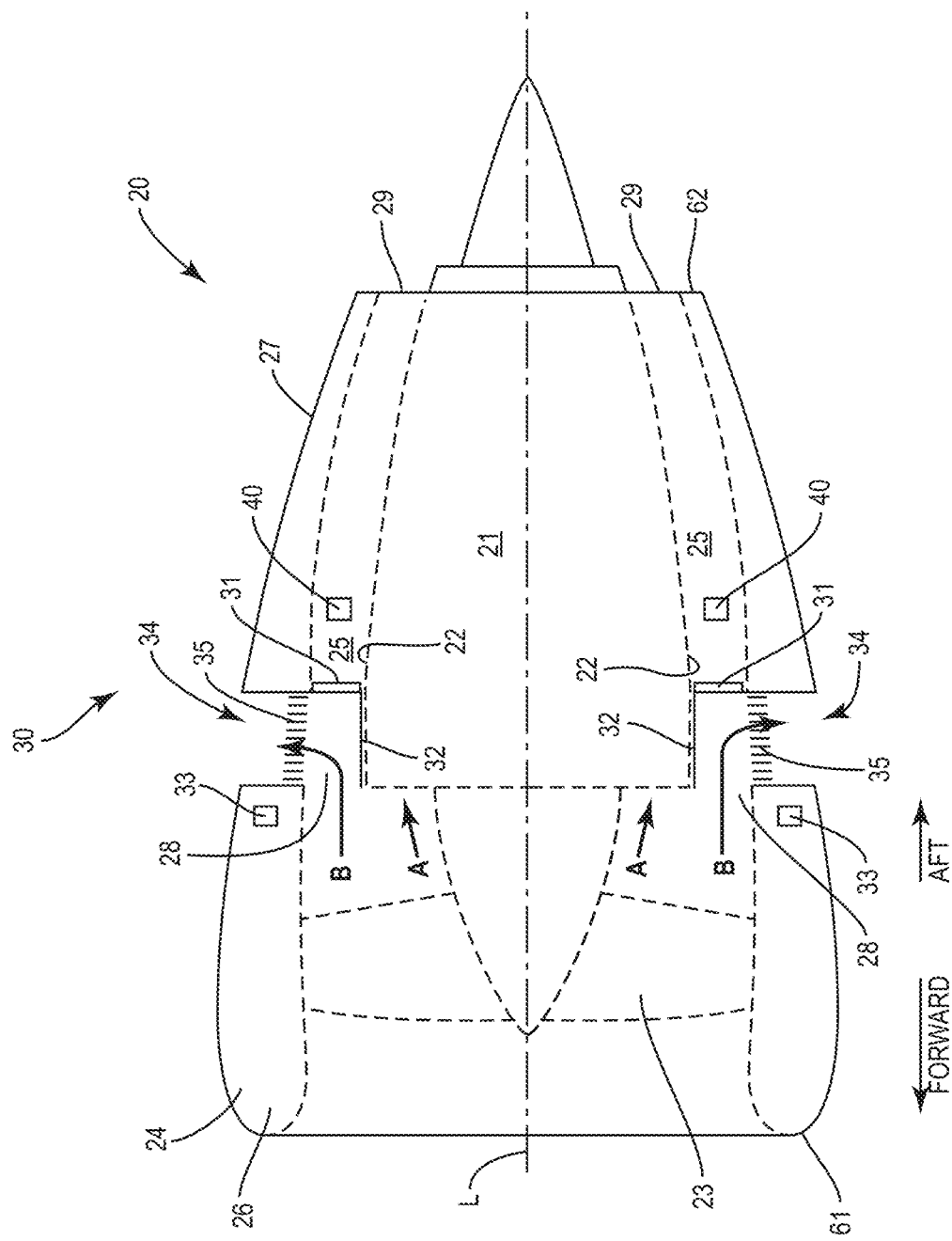
FIG. 3 is a side schematic view of the engine of FIG. 2 with a thrust reverser engaged to divert the airflow in the fan duct.

FIG. 3 illustrates the thrust reverser 30 in a deployed state. Actuators 33 cause the sleeve 27 to translate in an aft direction to form an opening 34 between the fixed section 26 and the sleeve 27. The drag links 32 are actuated to a second orientation to position the blocker doors 31 across the fan duct 25. This position forces the air through the opening 34. The air flows through cascade members 35 such as in the form of cascade vanes and exits the fan nacelle 24 as reverse efflux air flow.

An acoustic attenuation system 40 is positioned in the fan duct 25 aft of the blocker doors 31. The acoustic attenuation system 40 functions to control the sound that is produced by the fan 23. In some examples, the acoustic attenuation system 40 lessens the sound produced by the fan 23 thus allowing the aircraft 100 to meet noise regulations. The acoustic attenuation system 40 comprises one or more acoustic vanes that extend into the fan duct 25. The number of acoustic vanes and the positioning can vary depending upon the desired noise attenuation. In some examples, the acoustic vanes are positioned radially completely around the engine core 21. In other examples, the acoustic vanes are positioned radially around one or more limited sections of the engine core 21. The longitudinal positioning of the acoustic vanes can vary between the blocker doors 31 and the nozzle exit 29 of the fan duct 25.

Figure 4:
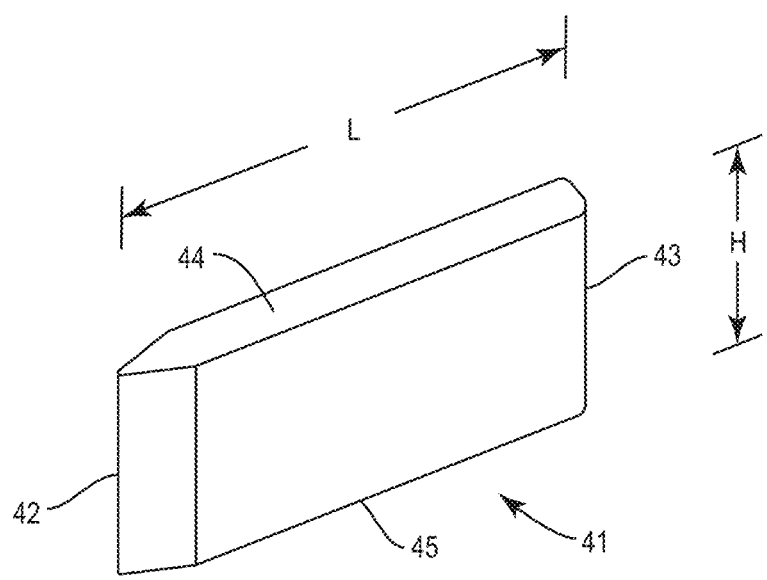
FIG. 4 is a schematic perspective view of an acoustic vane.

FIG. 4 schematically illustrates a vane 41 that is part of the acoustic attenuation system 40. The vane 41 includes a forward end 42 that is positioned in a forward direction in the fan duct 25, and an opposing aft end 43. In some examples, one or both of the forward end 42 and aft end 43 include a tapered shape to direct the airflow. The vane 41 includes a length L measured between the ends 42, 43. When the vane 41 is mounted to the core nacelle inner wall 22, an inner lateral side 44 is positioned inward into the fan duct 25 and an outer lateral side 45 is positioned away from the fan duct 25, such as against the core nacelle inner wall 22 or sleeve 27. A height H is measured between the sides 44, 45. The vane 41 can be constructed according to standard fabrication methods. In some examples, the vane 41 is substantially flat and can have a range of depths to meet frequency targets.

The number of fan blades and their rotational speed determines a characteristic fan blade-pass frequency for a given engine manufacture and configuration. The acoustic vanes 41 can include various thicknesses to tailor the acoustic performance. In some examples, the thickness of the acoustic vanes 41 is set to target the characteristic blade-pass frequency. Lower targeted frequencies are attenuated by thicker vane or nacelle wall designs. In some examples that target multiple frequencies, the acoustic vanes 41 include different thicknesses. The amount of surface area that is acoustically treated in conjunction with the thickness for the targeted frequency can be designed to increase or decrease the amount of acoustic attenuation.

The acoustic attenuation system 40 can include various numbers of acoustic vanes 41 to match the acoustic needs. The configuration of the acoustic vanes 41 can be adjusted to address induced tones due to their presence in the airflow.

In some examples, the acoustic vanes 41 are radially aligned with the drag links 32 in the fan duct 25. The acoustic vanes 41 are positioned aft of the drag links 32 which locates the acoustic vanes 41 in the already disturbed air flow. This positioning can provide protection to the forward end 42 of the acoustic vanes 41. In other examples, the acoustic vanes 41 are radially offset from the drag links 32. In some examples, the entirety of the acoustic vanes 41 are aligned with the drag links 32. In other examples, the forward end 42 is aligned with the drag links 32 with other sections misaligned, such as the aft end 43.

Figure 5:
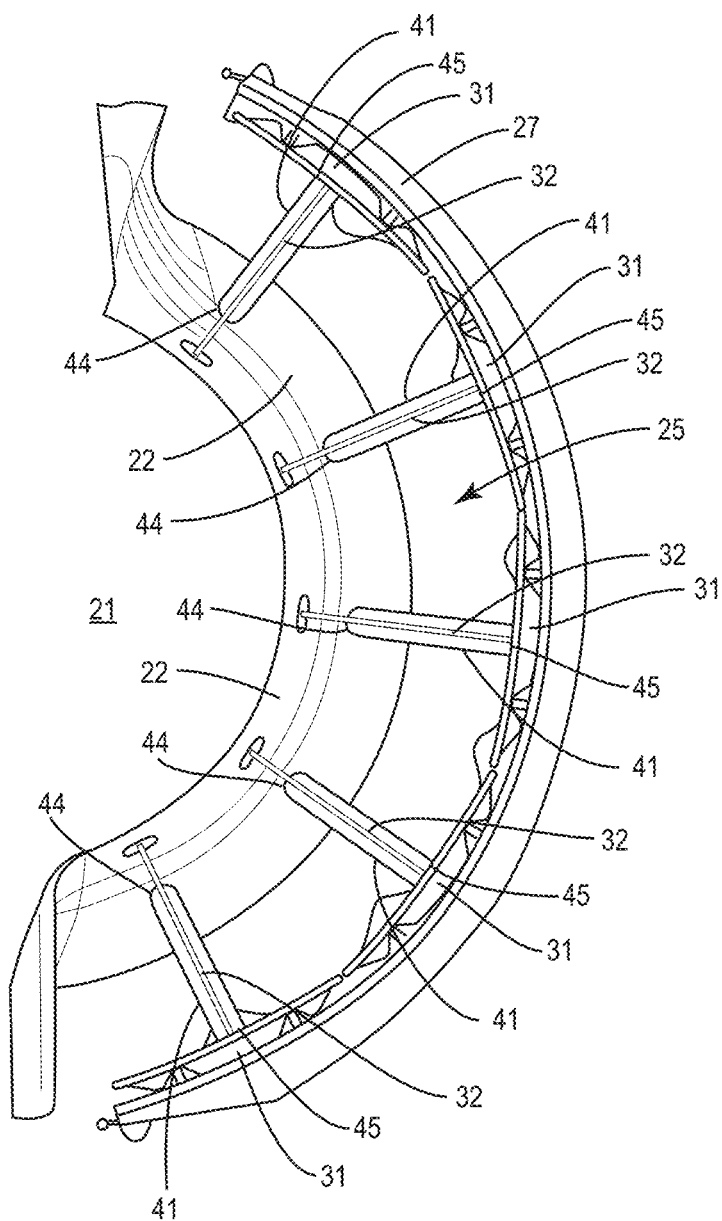
FIG. 5 is a partial front view of acoustic vanes mounted in a fan duct and radially aligned with drag links of a thrust reverser.

FIG. 5 is a view looking into the fan duct 25 from the front of the engine. Acoustic vanes 41 are positioned in the fan duct 25 and radially aligned around the engine core 21. The acoustic vanes 41 are radially aligned in the fan duct 25 with the drag links 32. The acoustic vanes 41 are positioned aft of the drag links 32. This positioning does not interfere with the operation of the drag links 32 and blocker doors 31.

In the example of FIG. 5, the acoustic vanes 41 are mounted to an outer side of the fan duct 25. In some examples, the outer lateral side 45 of the acoustic vanes 41 are mounted to the sleeve 27. In another example, the acoustic vanes 41 are mounted to other structural members at the outer side of the fan duct 25. In some examples, the acoustic vanes 41 are mounted to the sleeve 27 and translate during movement of the sleeve 27. In other examples, the acoustic vanes 41 are connected to a structural member that does not translate during actuation of the thrust reverser 30.

In another example, the acoustic vanes 41 are connected to an inner side of the fan duct 25. In some examples, this includes the outer lateral side 45 mounted to the core nacelle inner wall 22, or other structural member.

In some examples, the height H of the acoustic vanes 41 is less than the width of the fan duct 25. This difference in size provides for the inner lateral side 44 to be exposed within the fan duct 25. In other examples, the acoustic vanes 41 are sized to extend across the width of the fan duct 25 with the outer lateral side 45 connected to one side of the fan duct 25 and the inner lateral side 44 connected to the opposing side of the fan duct 25.

Figure 6:
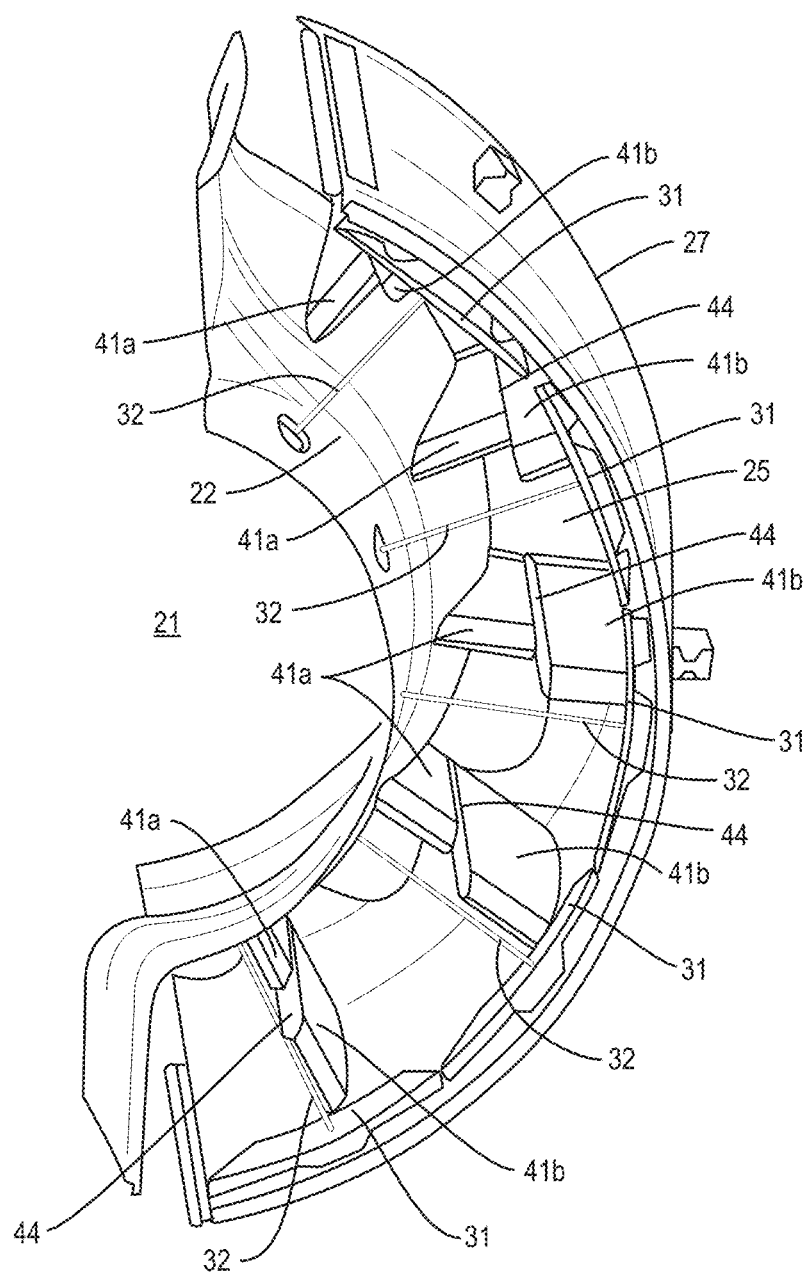
FIG. 6 is a partial end view in an aft direction of acoustic vanes with a first section and a second section and mounted in a fan duct.

FIG. 6 illustrates an example in which the acoustic vanes 41 are formed by two sections 41a, 41b. The first section 41a is mounted to the inner side of the fan duct 25, such as the core nacelle inner wall 22. The second section 41b is mounted to an outer side of the fan duct 25, such as the sleeve 27 or structural member. The sections 41a, 41b are radially aligned to pair and form a single acoustic vane 41.

In some examples, the inner lateral sides 44 abut together. In other examples, the inner lateral sides 44 are spaced apart by a gap. In some examples, the second sections 41b are mounted to a non-translating section of the sleeve 27. In other examples, the second sections 41b are mounted to the sleeve 27 and translate with the sleeve 27. During the translating movement, the second section 41b axially moves along the first section 41a. The shapes and sizes of the sections 41a, 41b can be the same or different. In some examples, the sections 41a, 41b include different lengths L.

Figure 7:
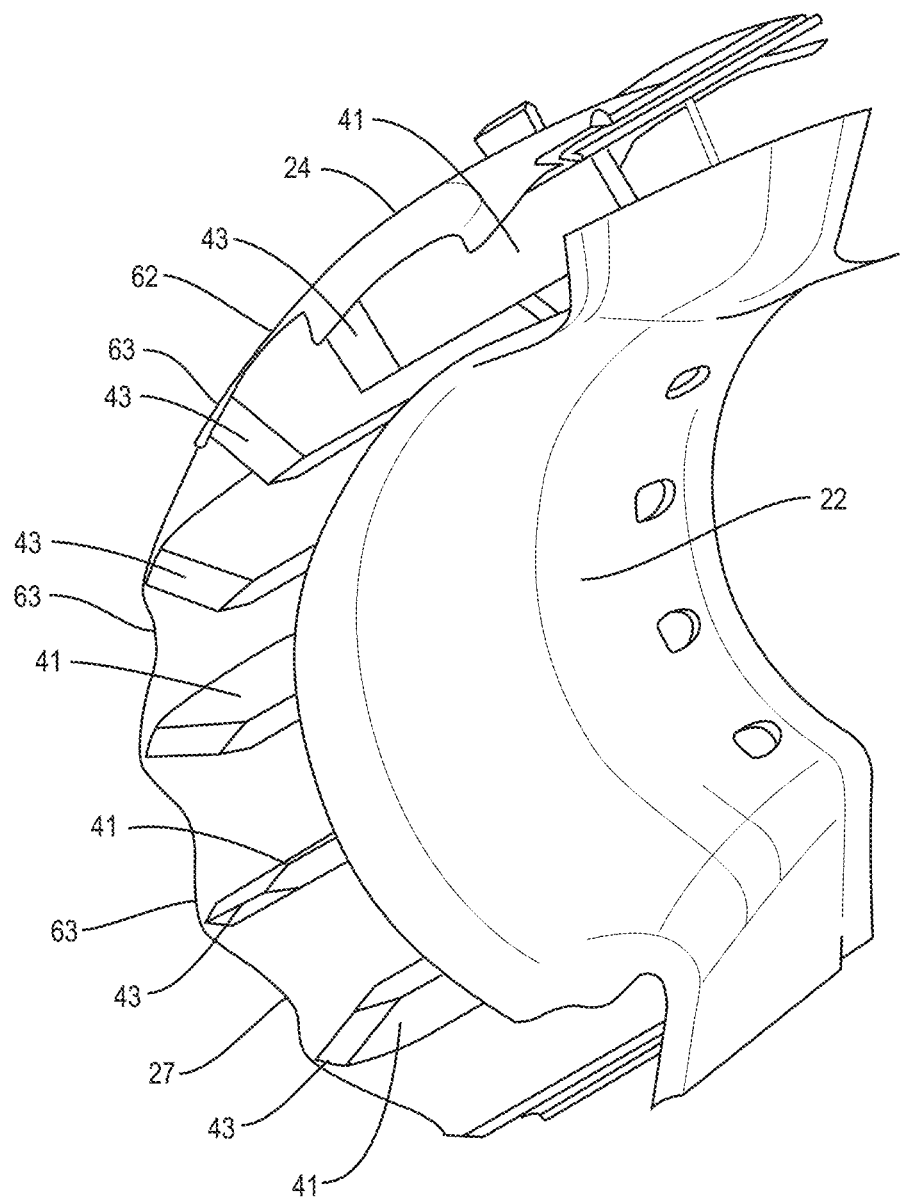
FIG. 7 is a partial end view in an aft direction of acoustic vanes mounted in a fan duct and longitudinally aligned with an aft end of a fan nacelle.

The acoustic vanes 41 can be located at different longitudinal positions along the fan duct 25 between the drag links 32 and the aft end of the nozzle exit 29. In some examples, the aft end 43 of the acoustic vanes 41 are aligned with a plane formed by the nozzle exit 29. In some examples as illustrated in FIG. 7, the aft end 62 of the fan nacelle 24 includes chevrons 63. In some examples as illustrated in FIG. 7, the acoustic vanes 41 are attached to the sleeve 27 that forms the aft section of the fan nacelle 24. In these examples, the acoustic vanes 41 translate with the movement of the sleeve 27.

Figure 8:
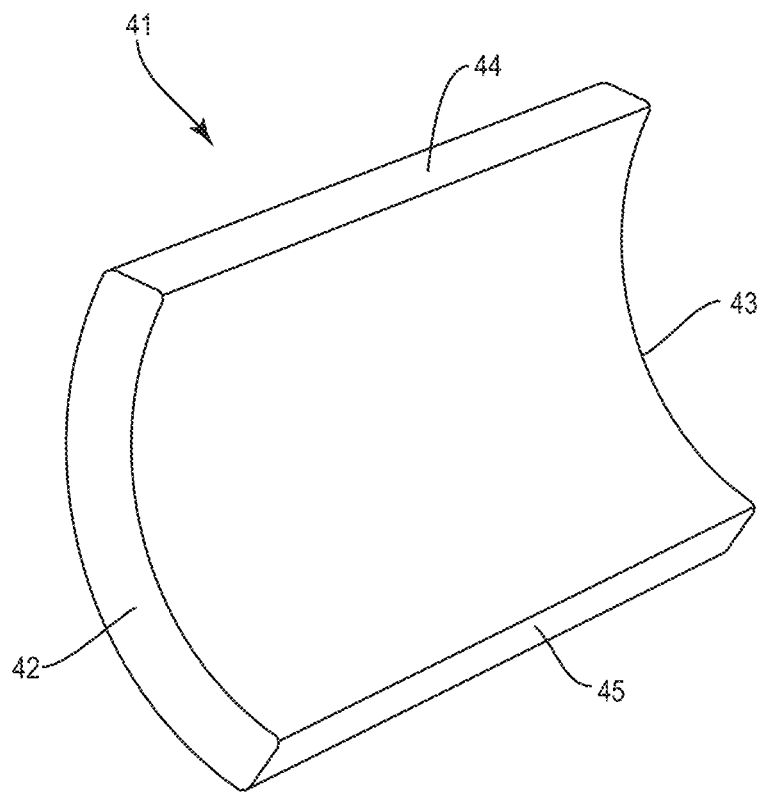
FIG. 8 is a schematic perspective view of an acoustic vane.

The acoustic vanes 41 can include various shapes and sizes. FIG. 8 illustrates an example with the vane 41 having a curved shape between the inner and outer lateral sides 44, 45. FIG. 4 illustrates another example with the vane 41 being straight between the inner and outer lateral sides 44, 45.

Figure 9:
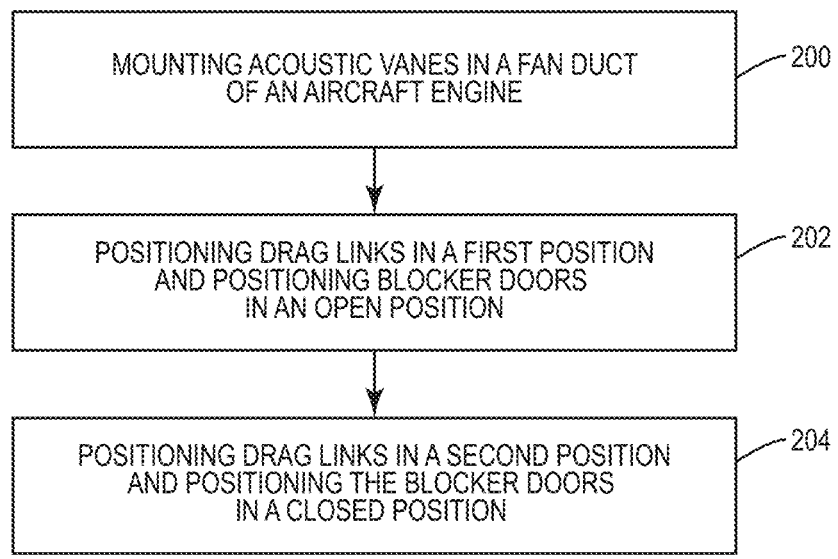
FIG. 9 is a flowchart diagram of a method of reducing engine noise of an aircraft.

FIG. 9 illustrates a method of reducing noise produced by a fan 23 of an engine 20 of an aircraft 100. The method includes mounting acoustic vanes 41 in a fan duct 25 of the engine 20 (block 200). The acoustic vanes 41 are positioned aft of drag links 32 of a thrust reverser 30 and positioned in disturbed air caused by the drag links 32. During operation of the engine 20, the drag links 32 are positioned in a first position with blocker doors 31 in an open position to enable airflow through the fan duct 25 from an inlet 28 to an nozzle exit 29 (block 202). The drag links 32 are positioned in a second position with the blocker doors 31 in a closed position to direct the airflow in the fan duct 25 away from the nozzle exit 29 (block 204).

One advantage of the acoustic attenuation system 40 is the ability to retrofit existing engines 20. The retrofit can be accomplished without the need for a redesign of the airflow through the engine 20. The acoustic attenuation system 40 can also be readily integrated into new engine designs.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:
1. An engine of an aircraft comprising:
a fan;
an engine core that produces thrust to propel the aircraft;
a fan duct positioned downstream from the fan and that extends along a length of the engine core and is positioned between an engine core nacelle inner wall and a fan nacelle, the fan duct comprising an inlet and a nozzle exit;

a thrust reverser positioned along the fan duct and comprising a plurality of blocker doors and drag links, the thrust reverser positionable between an open position and a closed position, the open position locates the blocker doors for the air to move along the fan duct and exit at the nozzle exit, the closed position locates the blocker doors across the fan duct to direct the air out of the fan duct through an opening in the fan nacelle;

an acoustic attenuation system comprising acoustic vanes mounted in the fan duct and positioned between the thrust reverser and the nozzle exit and aft of the drag links with each one of the acoustic vanes aligned behind a respective one of the drag links, the acoustic attenuation system configured to reduce fan blade-pass frequency noise caused by the fan; and wherein the acoustic vanes comprise:
- a first section mounted to and extending outward into the fan duct from a first side wall of the fan duct;
- a second section mounted to and extending outward from a second side wall of the fan duct; and
- the first section and the second section aligned on opposing sides of the fan duct and comprising inner lateral sides that face together.

2. The engine of claim 1, wherein the acoustic vanes are aligned in the fan duct around the engine core nacelle inner wall and connected to a wall of the fan duct.

3. The engine of claim 1, wherein the acoustic vanes comprise a forward end that is tapered, an opposing aft end, an inner lateral side, and an outer lateral side with the outer lateral side mounted to a wall of the fan duct.

4. The engine of claim 3, wherein the forward end of each of the acoustic vanes is aligned with one of the drag links for the acoustic vanes to be positioned in the fan duct in disturbed air flow.

5. The engine of claim 3, wherein the inner lateral sides of the acoustic vanes are exposed within the fan duct.

6. The engine of claim 1, wherein the acoustic vanes comprise a forward end and an aft end with the aft ends aligned with a plane aligned at the nozzle exit.

7. The engine of claim 1, wherein the fan nacelle comprises a forward section that is fixed and an aft section that translates along the fan duct with the second section of the acoustic vanes mounted to the aft section.

8. The engine of claim 1, wherein the acoustic vanes comprise a forward end, an opposing aft end, an inner lateral side, and an outer lateral side, the acoustic vanes comprising a shape that is curved between the inner lateral side and the outer lateral side.

9. The engine of claim 1, wherein the fan nacelle comprises chevrons at the nozzle exit and the acoustic vanes are aligned with the chevrons along the fan nacelle.

10. The engine of claim 1, wherein the acoustic vanes comprise different thicknesses.

11. An engine of an aircraft comprising:
a fan;
an engine core configured to produce thrust to propel the aircraft;
a fan duct that extends along the engine core downstream from the fan;
blocker doors mounted in the fan duct;
drag links mounted in the fan duct, each one of the drag links connected to one of the blocker doors, the drag links configured to move the blocker doors between an open position to direct airflow along the fan duct and a closed position to direct air out of the fan duct;
acoustic vanes mounted in the fan duct aft of the drag links, each of the acoustic vanes aligned with one of the drag links to be positioned in disturbed air caused by the respective one of the drag links; and
wherein the acoustic vanes comprise:
- a first section mounted to and extending outward into the fan duct from a first side wall of the fan duct;
- a second section mounted to and extending outward from a second side wall of the fan duct; and
- the first section and the second section aligned on opposing sides of the fan duct and comprising inner lateral sides that face together.

12. The engine of claim 11, wherein the acoustic vanes comprise a forward end and a trailing end, the acoustic vanes positioned in the fan duct with the forward ends aligned with the drag links.

13. The engine of claim 11, wherein the acoustic vanes comprise a flat shape with an inner lateral side that is straight, the inner lateral sides aligned with the drag links.

14. The engine of claim 11, further comprising a fan nacelle with a forward section that is fixed relative to the fan duct and an aft section that translates relative to the fan duct with the second section of the acoustic vanes mounted on the aft section of the fan nacelle.

15. The engine of claim 14, wherein the fan nacelle comprises chevrons at the aft section.

16. The engine of claim 11, wherein the inner lateral sides of the first section and the second section abut together.

17. The engine of claim 11, wherein the acoustic vanes comprise different thicknesses.

18. A method of reducing noise of an engine of an aircraft, the method comprising:
mounting acoustic vanes in a fan duct of the engine with the acoustic vanes positioned aft of and aligned behind drag links of a reverse thruster and positioned in disturbed air caused by the drag links;
positioning the drag links in a first position and positioning blocker doors in an open position to enable airflow through the fan duct from an inlet to a nozzle exit;
positioning the drag links in a second position and positioning the blocker doors in a closed position to direct the airflow in the fan duct away from the nozzle exit; and
wherein each of the acoustic vanes comprises an inner section and an outer section and further comprising translating the outer section relative to the inner section when moving the drag links from the first position to the second position.

19. The method of claim 18, further comprising translating the acoustic vanes along the fan duct while moving the drag links from the first position to the second position.

20. The method of claim 18, further comprising maintaining the inner sections of the acoustic vanes in fixed positions while translating the outer sections.

* * * * *